(Model.)
H. L. NORTON.
MOUSE TRAP.
No. 252,131. Patented Jan. 10, 1882.
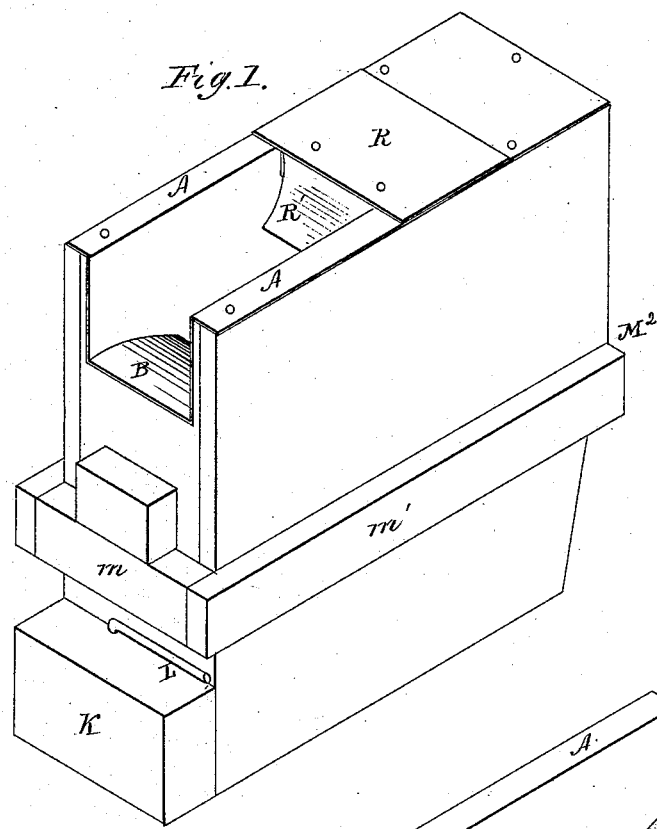
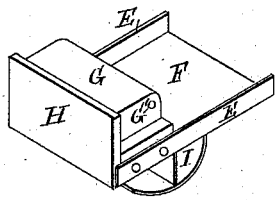
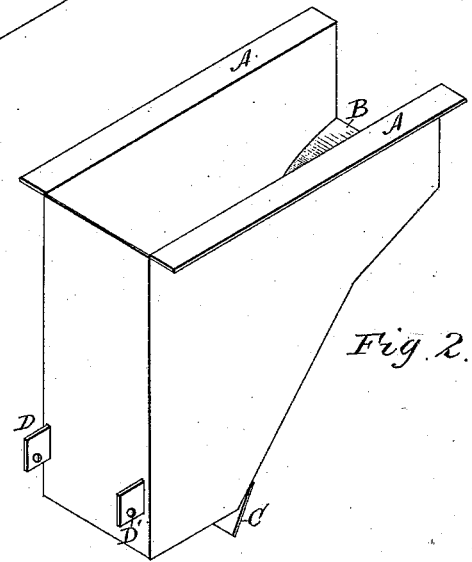
Witnesses
Lucius R. Hagen
Herbert L. Camp
Inventor
Henry L. Norton (Model.) 2 Sheets—Sheet 2.
H. L. NORTON.
MOUSE TRAP.
No. 252,131. Patented Jan. 10, 1882.
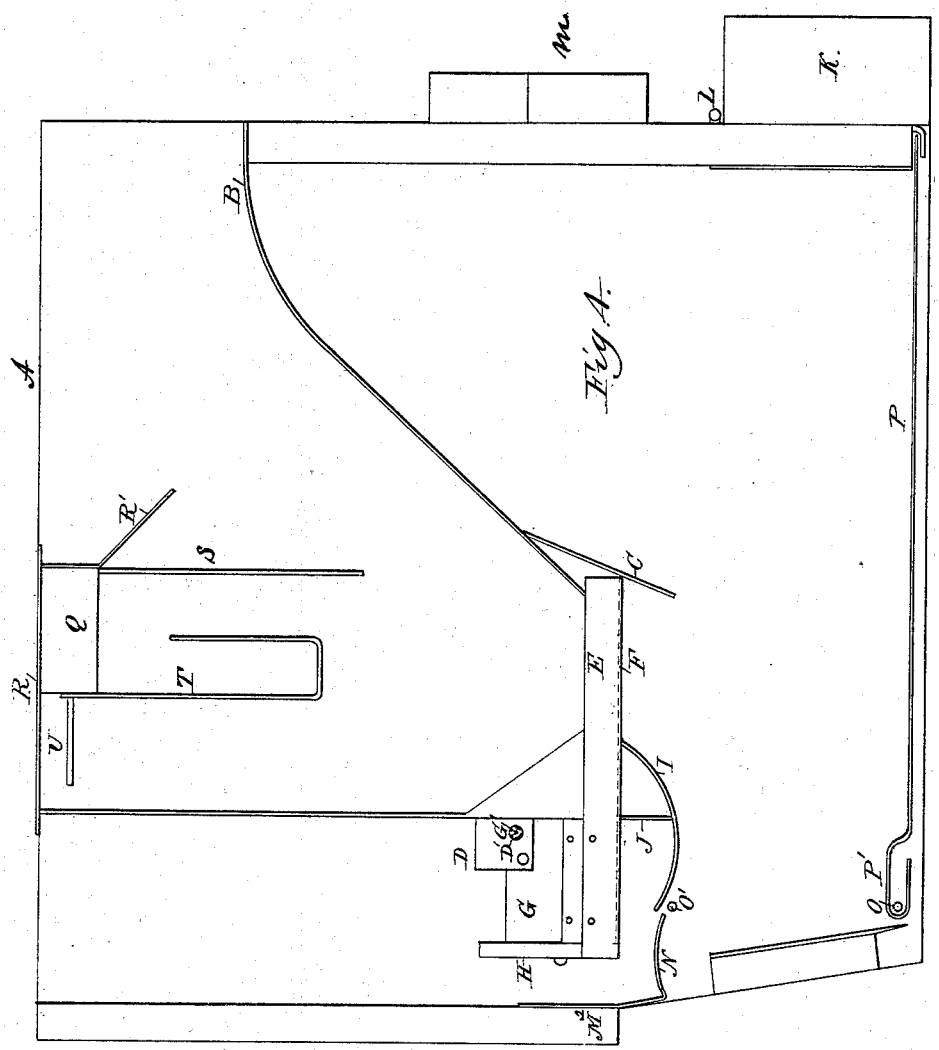
Witnesses
Lucius R Hagen
Arthur Titcomb
Inventor.
Henry L Norton

UNITED STATES PATENT OFFICE.

HENRY L. NORTON, OF MIDDLETOWN, CONNECTICUT.

MOUSE-TRAP.

SPECIFICATION forming part of Letters Patent No. 252,131, dated January 10, 1882.

Application filed July 6, 1881. (Model.)

*To all whom it may concern:*

Be it known that I, HENRY L. NORTON, of Middletown, in the county of Middlesex and State of Connecticut, have invented a new and useful Mouse-Trap, of which the following is a specification.

This invention consists, mainly, of a dish with a false or tipping-plate bottom, combined with other parts to make a complete and effective trap, as will be fully described hereinafter.

In the accompanying drawings, in which similar letters of reference indicate like parts, Figure 1 is a perspective of my invention. Fig. 2 is a view of the bottomless dish. Fig. 3 is a view of the tipping-plate which forms the false bottom of the dish. Fig. 4 is a sectional view of a trap, giving a sectional view of the wooden box part, also showing other parts working in connection with it. A sectional view of Fig. 2 is also here shown, with Fig. 3 complete and hinged to it in its proper place.

By reference to Fig. 2 it will be seen that both sides and one end of the dish are vertical. The other end is an inclined plane running outwardly from the bottom, so as to leave the dish longer at the top than at the bottom. At the top of the dish each side has a narrow portion turned outwardly to a right angle, as shown at A, thus forming what may be termed "resting-shoulders." The piece of metal used to form the inclined plane is a little longer than the depth of the dish. The upper end of this piece is turned downward, as shown by B. On the outside, and near the bottom of the inclined plane end of the dish, is soldered a piece of sheet metal, running entirely across the end of the dish and reaching below the bottom of the dish, as shown at C. Said piece C serves to protect the end of the tipping-plate from mice when in the trap. The dish is provided with two what may be termed "ears," which are soldered on the outside of the vertical end and a short distance above the bottom of the dish, as shown by D. Through each of these ears D is a small round hole, (shown by D'.) The dish is also provided with a baiting device, which is removable. Said device is shown in Fig. 4. This device (shown in Fig. 2) is made of suitable metal. The false or tipping-plate bottom of the dish is made of sheet metal and wood.

By reference to Fig. 3, which represents it, it will be seen that both sides of the bottom (which is metal) are turned upward to a right angle, as shown by E. The width between the two sides E is sufficient to allow the two parts to freely pass up on the outside of the lower part of the device shown in Fig. 2, and as shown in Fig. 4. When in its place the metal part F covers the otherwise open bottom of the dish. At one end and between the two sides E is placed a piece of wood, which fills the space between said sides E; but a little above them it is cut to a width that will allow it to turn freely between the two ears D, Fig. 2, as it is high enough to reach up above holes D'. The form of this wood part is shown by G and the screw-holes, or the point at which it is hinged by G'. Said piece G is held in its place by means of tacks, which are driven through sides E into the wood. The outside end of this wood part G is weighted, as shown by H. Said weight H serves to keep part F resting against the bottom of device shown in Fig. 2, which gives the dish the appearance of having a firm bottom. On the under side of this tipping-plate is soldered two pieces of sheet metal—one shown by I, the other by J—each piece reaching entirely across the tipping-plate. The piece I is bent so as to form a part of a given circle, said circle having screw-holes or point G' for its center, and is large enough to reach to a proper point below the tipping-plate. The two pieces I and J are cut to a true or straight edge. Part F is placed on a flat surface, and in that position the two above-named straight edges are pressed firmly against it and soldered. These two pieces running crosswise of the tipping-plate, in connection with the two sides E running lengthwise, as before described, serve to keep part F flat and cause it to rest evenly against the bottom of device shown in Fig. 2. When the two parts shown in Figs. 2 and 3 are combined by hinging them together the dish is formed. To hinge them together, place them as above described, and shown in Fig. 4, then put a small screw through each hole D', Fig. 2, and screw them into parts G, Fig. 3, so that the screw-heads shall rest lightly against the outside of ears D, thus keeping the tipping-plate bottom from working sidewise.

The box part is simply a wooden box made in height, length, and width so that it may be readily combined with the dish, it having a removable metal bottom, also side and end cleats. It is also provided with a bent wire, which works in connection with the removable bottom. At one end is placed cleat K. At the center of and on the inside of this cleat is cut a groove from top to bottom. Said wire is placed in the groove, and is shown by L. Each end of wire L is bent to a right angle with the upright part, but in point of direction varying one from the other ninety degrees. As the two ends of this wire vary one-fourth of a circle in point of direction, it will be seen that when the end which comes over cleat K is turned so as to rest against the end of the box the lower end of the wire will point directly to the other end of the box, the end piece of the box being cut off a little above the bottom of the sides to make room for the wire. A short distance above cleat K is placed another cleat, which is shown by m. Two side cleats (one on each side of the box) are shown by m'. At the other end of the box there is a projection, (shown by M², ) the end piece of the box being cut so as to come even with the projection in the sides. By referring to Fig. 1 it will be seen that the end cleat, m, also both side cleats, m', are placed on the box so that the lower edge of each shall be even with projection M², thus forming a resting-shoulder for the box. Above cleat m is placed another short cleat or step, as shown in Fig. 4. To the lower end of the end piece, M², is fastened a piece of metal, one end reaching under part I, as shown by N. Below part N the box is sufficiently closed with another short end piece, which is lined with metal, a narrow open space being left above and below it. The lower end of the opposite end piece of the box is also lined with metal. The inside of this box is provided with two wire bars, which are held in place by each end of the wires being driven into the sides of the box. Said wire bars are shown by O and O'. The removable bottom of the box is represented by P, one end being bent to form a hook, as shown by P'. Said box-bottom P is cut to a width that will allow it to swing freely between the sides of the box. The end P' is placed on wire bar O. The box-bottom is then swung upward to its place and held by means of the lower end of wire L being turned under it. As shown in the drawings, the metal lining of the end piece of the box that is under part M² has a point that comes below wire bar O. This point serves to keep the box-bottom P in its place.

The dish and box are united by placing the dish in the box so that shoulders A shall rest on the top of the box, the inclined-plane end of the dish being at the cleat end of the box. At this end the end piece of the box is cut off below the top of the sides so as to correspond with the difference in the height of parts A and B of the dish. They are fastened together by means of tacks being driven through parts A into the box. The open part of the top of the box is then closed with a suitable piece of metal.

The baiting device is made of wood, sheet metal, and wire, Q showing the wood part, R and R' representing the sheet-metal parts. S represents wire bars, and T wire hooks. A nail is driven part way into the wood part Q between the wire hooks T, as shown by U. The upper ends of wire bars S and wire hooks T are bent to a right angle and then driven into part Q. Part R' is soldered to part R. Tacks or wire pins are driven through part R into or through part Q. Each end of the wood part Q rests lightly against the side of the dish, thus keeping the baiting device in place. Hooks T are for holding the bait. Bars S prevent mice from reaching the bait. Part R rests on the dish, and both parts R and R' prevent mice from reaching the bait. The baiting device is placed in the dish so that the end of nail U rests against the perpendicular end of the dish. Said device is thus brought to its proper place.

The trap may be used as now completed, or in connection with a board of sufficient size to cover a tub or pail, said board being cut away in its center so as to receive the trap up to the resting-shoulder of the box, the removable box-bottom being taken from the trap, thus letting the mice drop through the trap into said tub or pail. As seen in the drawings, the lower part of one end of the box is cut at an angle that will permit the trap being placed in and on a board, as above described, said board being cut away only enough to receive the trap up to the resting-shoulder of the box, the open space in the board being entirely covered by said resting-shoulder.

By nature mice are sly, cautious, and always on the alert, holding on to some safe place before venturing into any dish of which they have suspicion of evil. When having suspicion that evil will result from their going into a dish they will hold on to the top of the dish with their hind feet while letting their bodies down into the dish, seemingly to satisfy themselves of safety. For this reason the piece forming the inclined plane of the dish is of sufficient length to prevent full-grown mice from reaching the tipping-plate bottom of the dish or the bait which may be placed on it without letting themselves loose from their hold on the upper end of the inclined plane.

Mice will not venture into a dish of greater depth than they can jump out of, provided it was firm as it appears to them. For this reason the depth of the dish is an important point as regards the merits of the trap, and is constructed with an inclined plane, and the dish may be of less depth than would otherwise be required. The dish being constructed as described, and shown in the drawings, is one that will deceive both full-grown and partly-grown mice into the idea that the dish is one they can easily retreat from if they venture in, for I have discovered by long and close observations of the habits of mice that they will venture into a dish with one side having an inclined plane, and with less suspicion of evil, than they will into a dish of the same depth having all its sides perpendicular, for I have discovered by watching their habits that a mouse can jump out of a dish having one side an inclined plane of greater depth than it could were all its sides perpendicular.

The above remarks apply to rats as well as to mice; and this trap, enlarged to a proper size, is designed to be used in catching them.

By referring to Fig. 4 it will be seen that as the tipping-plate bottom of the dish is opened and closed piece I is moved in the circle before mentioned, said piece I coming close to wire bar O'. The pieces I, O', and N in combination prevent mice from reaching the weighted end of the tipping-plate.

To bait the trap, place a suitable bait in hooks J, or a little flour or meal may be spread over the false bottom of the dish.

The operation of the trap is as follows: A mouse climbs upon the trap, cleats K and M serving as steps in addition to their uses already given, and, as mice cannot reach the bait while on the trap, they jump upon the false or tipping-plate bottom of the dish. Their weight being greater than weight H can hold up, the tipping-plate bottom falls from under them, and they drop into the wooden-box part of the trap. As soon as the mouse slides off from the tipping-plate bottom it immediately flies back to its place by force of the weighted end H.

To dispose of the mice, hold the trap over a tub or pail partly filled with water, then turn wire L so that the end which is over cleat K will point out directly from the end of the trap. Thus doing, you turn the lower end of the wire from under the removable bottom P, and of its own weight it will turn from under them.

The trap may be used with or without the baiting device. When used without the baiting device and in connection with a board, as before described, the trap represents an open dish placed on a board. It is therefore called the "open-dish mouse-trap."

What I claim as my invention is—

1. The combination of the dish having an inclined side and three vertical sides and the ears D, supporting a tipping-plate bottom having the block G and curved piece I, an inclosing-box provided with the resting-shoulders m, partition N, removable bottom P, and wire L, and a baiting device, substantially as described.

2. The combination, with the dish having an inclined side and three vertical sides, and provided with the ears D, of the tipping false bottom F, hinged to D, and provided with the block G and weight H, the partition N, and an inclosing-box provided with the resting-shoulders m, substantially as described.

3. In combination with a hollow dish, constructed as described and provided with a tipping-bottom plate, the baiting-hooks T, suspended from the plate R, the protecting-bars S, and plate R', substantially as described.

HENRY L. NORTON.

Witnesses:
FREDERIC VINAL,
J. E. DENNIS.